United States Patent
Jin (10) Patent No.: US 9,010,724 B2
(45) Date of Patent: Apr. 21, 2015

(54) THROTTLE VALVE

(75) Inventor: Renzhao Jin, Zhejiang (CN)

(73) Assignee: Ningbo Allko Automobile Air-Conditioners Co., Ltd., Fenghua (CN)

( * ) Notice: Subject to any disclaimer, the term of this patent is extended or adjusted under 35 U.S.C. 154(b) by 812 days.

(21) Appl. No.: 13/143,177

(22) PCT Filed: Oct. 12, 2010

(86) PCT No.: PCT/CN2010/001593
§ 371 (c)(1), (2), (4) Date: Aug. 24, 2011

(87) PCT Pub. No.: WO2011/044754
PCT Pub. Date: Apr. 21, 2011

(65) Prior Publication Data
US 2011/0297858 A1 Dec. 8, 2011

(30) Foreign Application Priority Data
Oct. 13, 2009 (CN) .......................... 2009 1 0206816

(51) Int. Cl.
*F16K 31/06* (2006.01)
*F16K 3/26* (2006.01)
*F25B 41/06* (2006.01)

(52) U.S. Cl.
CPC ............. *F16K 31/0668* (2013.01); *F16K 3/267* (2013.01); *F25B 41/062* (2013.01); *F25B 2341/0653* (2013.01); *Y02B 30/72* (2013.01)

(58) Field of Classification Search
USPC ........................ 251/129.02, 129.15
See application file for complete search history.

(56) References Cited

U.S. PATENT DOCUMENTS

| | | | | |
|---|---|---|---|---|
| 2,601,549 | A * | 6/1952 | Morton et al. | 62/198 |
| 3,625,474 | A * | 12/1971 | Juede | 251/77 |
| 3,670,768 | A * | 6/1972 | Griswold | 137/606 |
| 4,635,683 | A * | 1/1987 | Nielsen | 137/625.65 |
| 5,487,410 | A * | 1/1996 | Niethammer | 137/625.65 |
| 5,782,267 | A * | 7/1998 | Yoo | 137/596.17 |
| 6,155,654 | A * | 12/2000 | Oyama | 303/117.1 |
| 6,732,999 | B2 * | 5/2004 | Matsusaka et al. | 251/129.15 |
| 7,367,636 | B2 * | 5/2008 | Ho | 303/119.2 |

(Continued)

FOREIGN PATENT DOCUMENTS

WO PCT/CN2010/001593    1/2011

*Primary Examiner* — Eric Keasel
*Assistant Examiner* — Jonathan Waddy
(74) *Attorney, Agent, or Firm* — Wang Law Firm, Inc.; Li K. Wang; Stephen Hsu (57) ABSTRACT

A throttle valve comprises a valve body (1) provided with a flow passage (13) and a mounting hole (14), a valve core movably inserted inside the mounting hole (14) and a driving mechanism for the valve core disposed out of the valve body (1) and connected with the valve body (1); the driving mechanism directly drives the valve core to slide axially, said driving mechanism includes a valve seat (2) with a cavity (21) inside, a coil (3) disposed in said cavity (21), a magnetic element (4) surrounded by said coil (3), which can be driven to slide relatively to said coil (3) by the electromagnetic force, an iron core (5) connected with said valve core and said magnetic element (4), and an elastic part acting on said valve core. The damping force of the elastic part to said valve core resists the electromagnetic force of said coil (3) to said magnetic element (4). The throttle valve of the present invention has simple structure, low cost and light weight.

11 Claims, 8 Drawing Sheets

(56) References Cited

U.S. PATENT DOCUMENTS

| | | |
|---|---|---|
| 8,382,064 B2 * | 2/2013 | Nisinosono et al. ..... 251/129.15 |
| 2006/0082950 A1 * | 4/2006 | Lent et al. ................ 361/212 |
| 2006/0097211 A1 * | 5/2006 | Spurlock et al. ......... 251/129.15 |
| 2007/0170387 A1 * | 7/2007 | Yamamoto et al. ...... 251/129.15 |
| 2008/0251748 A1 * | 10/2008 | Neff et al. ............... 251/129.15 |

* cited by examiner

THROTTLE VALVE

CROSS REFERENCE TO RELATED PATENT APPLICATION

The present application is the US national stage of PCT/CN2010/001593 filed on Oct. 12, 2010, which claims the priority of the Chinese patent application No. 200910206816.9 filed on Oct. 13, 2009, which application is incorporated herein by reference.

FIELD OF THE INVENTION

The present invention relates to a kind of throttle valve to regulate the flux of the fluid, which is specially applicable to variable frequency air conditioners, commercial air conditioners, central air conditioners, refrigerated food cabinets and other constant temperature and humidity equipments.

DESCRIPTION OF THE PRIOR ART

The throttle valve in the refrigeration system usually consists of three types: capillary tube throttle valve, thermal expansion valve (inner balance and outer balance) and electronic expansion valve. At present, in the refrigeration system, the electronic expansion valve (EEV) is a new type of throttling device controlled by a microprocessor, which results in direct control and regulation of refrigeration cycle by a microcomputer. The EEV is characterized in large regulation range, rapid and agile movement, precise regulation, good stability and reliability, and in the EEV, the refrigerant can flow in pro and con two directions, which can avoid the single-way flow in the thermal expansion valve. And it can also simplify the refrigeration system when the EEV is applied to the heat pump. When the refrigeration system stops, the EEV can be fully closed, it can avoid the use of solenoid valve installed in the refrigerant inlet. Therefore, the EEV is highly favored in the refrigeration industry.

The EEV we say usually refers to the stepper motor type, which is composed of a valve body, a valve core, a corrugated pipe, a transmission mechanism, a pulse stepper motor, etc. Wherein the pulse steeper motor acts as the drive mechanism, the corrugated pipe separates the refrigerant channel from the moving parts to prevent leakage of the refrigerant, and the transmission mechanism converts the motor rotation into the reciprocating motion of the valve core to determine the opening degree of the valve port, so as to control the flux of the refrigerant flow. There are many patents about the EEV, for example, an expansion valve disclosed in Chinese Patent CN2564804Y, another expansion valve disclosed in Chinese Patent CN2580367Y, one more expansion valve disclosed in Chinese Patent CN270319Y.

The electronic expansion valve structures above stated are basically similar. There are two types of transmission mechanisms to convert the motor rotation into the reciprocating motion of the valve core, i.e. the deceleration-type transmission mechanism which is composed of a gear pair, a screw thread pair, a transmission rod, etc., and the direct-acting transmission mechanism without a gear pair. Both of the transmission mechanisms have defects of excessive components, and complicated structure and high weight. Moreover, the mechanism should be powered by an expensive stepper motor, which results in high costs of the current electronic expansion valve for refrigerant flow regulating.

In conclusion, the current throttle valve to regulate the flux of the fluid has to be improved.

SUMMARY OF THE INVENTION

It is an object of the present invention to provide a throttle valve with a novel, simple and low-cost structure, in which the abrasion among the components is very low and the motion of the components is in balance too.

For achieving above stated object, the throttle valve comprising:

a valve body with an inlet and an outlet disposed on the wall of the valve body, provided with a flow passage in the valve body which is communicated with said inlet and said outlet, and a mounting hole in the valve body which is communicated with said flow passage;

a valve core movably inserted inside the mounting hole, being able to slide relatively to said valve body to change a flow section of said flow passage for regulating a flux of flow passing through said flow passage, a sealing mechanism disposed between said valve core and said mounting hole to prevent the fluid entering into said mounting hole from said flow passage, an outer end of said valve core extending out of the valve body, an inner end of said valve core entering into said flow passage;

a driving mechanism for the valve core disposed out of the valve body and connected with the outer end of said valve core;

characterized in that the driving mechanism directly drives the valve core to slide axially, said driving mechanism includes:

an actuator housing fixed on said valve body, provided with a cavity inside, and the outer end of said valve core entering into said cavity;

a coil disposed in said cavity;

a magnetic element surrounded by said coil, which can be driven to slide relatively to said coil by an electromagnetic force generated by said coil when supplied with current;

an iron core connected with said valve core and said magnetic element; and an elastic part acting on said valve core, a damping force of the elastic part to said valve core resisting the electromagnetic force of said coil to said magnetic element.

As a preference, the mounting hole runs through the flow passage; the valve core is a plunger piston with a ring groove in middle which matches with the flow passage, an overlap area between the ring groove and the section of the flow passage determines a flow section of the flow passage; an upper portion of the plunger piston is located in a portion of the mounting hole which is above the flow passage; a top wall of the mounting hole is provided with a balance opening; a lower portion of the plunger piston is located in a portion of the mounting hole which is below the flow passage; the outer end of the plunger piston enters into the cavity, and a bottom wall of the cavity is provided with a vent hole. The vent hole also can be a vent gap, to mainly ensure the smooth downward movement of the plunger piston. Above said is a detailed embodiment of the valve core, such plunger piston of the valve core is particularly applicable to the horizontal flow passage in 1 shape.

In order to ensure the sealing effect between the plunger piston and the mounting hole, as a preference, the sealing mechanism is two seal rings which are respectively disposed between the peripheral wall of upper portion of the plunger piston and the inner wall of the mounting hole, and between the peripheral wall of lower portion of the plunger piston and the inner wall of the mounting hole. Such sealing method can make the structure simple, and the assembling easy.

Generally, the valve body is an alloy die casting with relatively poor wear resistance. If the plunger piston directly rubs the inner wall of the mounting hole when sliding, the valve body will be worn easily, it will then reduce the sealing capability between the plunger piston and the mounting hole. As a preference, a liner tube is tightly inserted into the mounting hole, the liner tube has a through hole which is an overlap channel of the flow passage, the plunger piston is located in the liner tube. The liner tube can be made of good wear-resistant materials such as wear-resistant steels, therefore, the plunger piston will not directly rub the inner wall of the mounting hole and will directly rub the inner wall of the liner tube, while the liner tube is wear-resistant, so the usage life of the throttle valve will be increase greatly.

In order to ensure the sealing effect between the plunger piston and the liner tube, as a preference, the sealing mechanism is two seal rings which are respectively disposed between the peripheral wall of upper portion of the plunger piston and the inner wall of the liner tube, and between the peripheral wall of lower portion of the plunger piston and the inner wall of the liner tube. Such sealing method can make the structure simple, and the assembling easy.

As a preference, a top of the iron core is connected with a bottom of the plunger piston through a linker, and a bottom of the iron core is directly fixed with the magnetic element. Of course, the iron core can directly fixed with the plunger piston.

As a preference, the elastic part is a spring which locates in the mounting hole above the flow passage, one end of the spring is against a top of the plunger piston. Of course, the spring can also locate in the mounting hole below the flow passage, one end of the spring resist against the bottom of the plunger piston.

In order to prevent the wearing of the coil by the sliding magnetic element, as a preference, a slide-guiding sleeve is inserted between the coil and the magnetic element.

As a preference, an upper supporting sleeve and a lower supporting sleeve are both disposed in the cavity of the actuator housing, between these two supporting sleeves the coil is located;

said elastic part is two disk shaped springs which include a first disk shaped springs locating at top of the coil and a second disk shaped springs locating at bottom of the coil, an edge of the first disk shaped springs is suppressed between the upper supporting sleeve and the top of the coil, an edge of the second disk shaped springs is suppressed between the lower supporting sleeve and the bottom of the coil, and central parts of two disk shaped springs are respectively fixed with the iron core.

As a preference, the flow passage is L-shaped, said valve core is a valve needle provided with a conical head matching with a bottom of a vertical part of the flow passage, an outer end of the valve needle enters into the cavity, and the bottom of the cavity is provided with a vent hole. The vent hole also can be a vent gap, to mainly ensure the smooth downward movement of the valve needle. Above said is another common embodiment of the valve core.

As a preference, said elastic part is a spring disposed on the valve needle, a top of the spring resists against the bottom surface of the valve body and the bottom of the spring resists against a ring shoulder formed on the bottom of the valve needle. The installation method of the spring is applicable when the valve core is a valve needle.

Compared with the prior art, in this present invention, the driving mode of the valve core that is the valve core is driven to slide along the axis under the electromagnetic force, is different from that of the prior art. Such driving mode dispenses with the use of a stepper motor, a gear pair and a screw thread pair which is necessary for the driving structure of the valve core din the existing inflating valve, and is simple in structure, therefore, the throttle valve of the present invention has simple structure, light weight and is in low cost. Moreover, the throttle valve of the present invention involves fewer components, so as to ensure less friction among the components. And the valve core in the driving structure of the present invention has a single translation motion, accordingly, the motion of the throttle valve is in balance.

DETAILED DESCRIPTION OF THE PREFERRED EMBODIMENT

To enable a further understanding of the innovative and technological content of the invention herein, refer to the detailed description of the invention and the accompanying drawings below:

FIGS. 1~5 show the first embodiment of the present invention.

Figure 1:
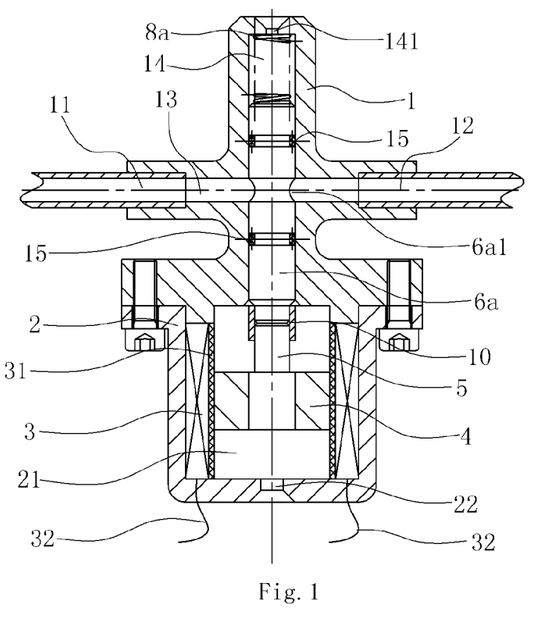
FIG. 1 is the sectional view of the first embodiment of the throttle valve of the present invention when the flow section of the flow passage is in the maximum state.
Figure 2:
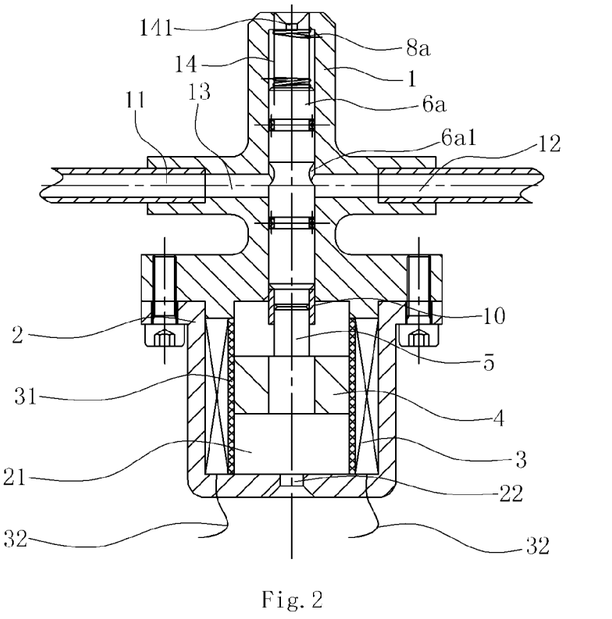
FIG. 2 is the sectional view of the first embodiment of the throttle valve of the present invention when the flow section of the flow passage is in the intermediate state.

In this embodiment, the throttle valve comprises a valve body 1, a valve core and a driving mechanism for the valve core.

The valve body 1 is provided with an inlet 11 and an outlet 12 on the wall of the valve body 1 which are both on the same horizontal axis. A flow passage 13 with a linear axis is disposed in the valve body 1 which communicated with the inlet 11 and the outlet 12, and a mounting hole 14 is disposed in the valve body 1 which communicated with the flow passage 13, the mounting hole 14 runs across the flow passage 13 in this embodiment.

In this embodiment, the valve core is a plunger piston 6a which is movably inserted inside the mounting hole 14 and is able to slide relatively to the valve body 1. An upper portion of the plunger piston 6a is located in a portion of the mounting hole 14 which is above the flow passage 13; a seal ring 15 is disposed between the peripheral wall of upper portion of the plunger piston 6a and the inner wall of the mounting hole 14; a top wall of the mounting hole 14 is provided with a balance opening 141; a lower portion of the plunger piston 6a is located in a portion of the mounting hole 14 which is below the flow passage 13; another seal ring 15 is disposed between the peripheral wall of lower portion of the plunger piston 6a and the inner wall of the mounting hole 14, it can prevent the leakage of the fluid such as refrigerant from the two ends of the plunger piston 6a.

Figure 3:
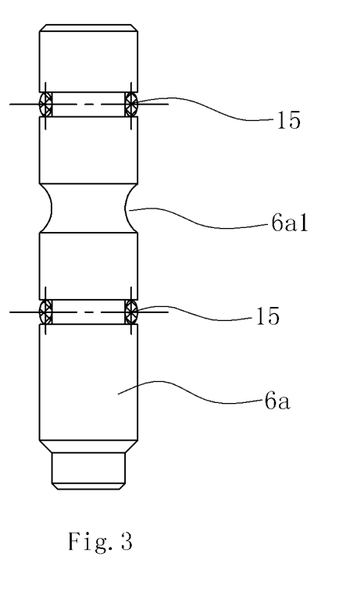
FIG. 3~5 are the front views of the plunger piston in the first embodiment of the throttle valve of the present invention with three different shapes of the sectional view of the ring groove.
Figure 4:
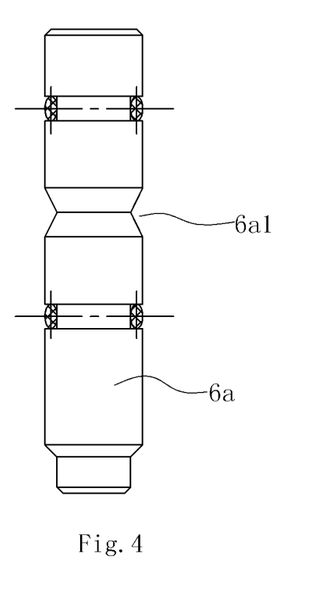
Figure 5:
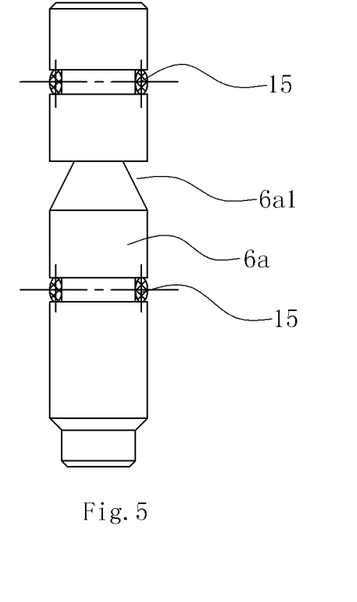

The plunger piston 6a is provided a ring groove 6a1 in middle, in this embodiment, the ring groove 6a1 can be in concave arc-shape (as shown in FIG. 3), or in two connecting conic shape in mirror images (as shown in FIG. 4), or in a sharp needle shape (as shown in FIG. 5), and etc. The ring groove 6a1 matches with the flow passage 13, an overlap area between the ring groove 6a1 and the section of the flow passage 13 determines the flow section of the flow passage 13; when the ring groove 6a1 is just fully inside the flow passage 13, the flux of the fluid such as refrigerant passing through the flow passage 13 is large; when the ring groove 6a1 is just fully outside the flow passage 13, the flow passage 13 is intercepted with no fluid such as refrigerant passing by; in other words, the larger overlap area between the ring groove 6a1 and the section of the flow passage 13, the larger flux of flow passing through the flow passage 13; therefore, the axial sliding of the plunger piston 6a can change a flow section of the flow passage 13 for regulating a flux of flow passing through the flow passage 13. While the outer end of the plunger piston 6a extents out of the valve body 1.

The driving mechanism for the valve core is disposed out of the valve body 1 and connects with the portion of the valve core exposed out of the valve body 1, the driving mechanism directly drives the plunger piston 6a to slide axially.

The driving mechanism includes:

an actuator housing 2 fixed on said valve body 1 through a bolt, which is provided with a cavity 21 inside, and the outer end of the plunger piston 6a enters into the cavity 21, and a bottom wall of the cavity 21 is provided with a vent hole 22;

a coil 3 disposed in the cavity 21, a slide-guiding sleeve 31 is inserted between the coil 3 and the magnetic element 4, two connecting wires 32 on the coil 3 pass through the bottom of the actuator housing 2 to connect with the power supply outside;

a magnetic element 4 made of magnetic materials in columnar shape, is located in the slide-guiding sleeve 31 which is also in columnar shape, the inner peripheral surface of the slide-guiding sleeve 31 joints with the outer peripheral surface of the magnetic element 4, while the outer peripheral surface of the slide-guiding sleeve 31 joints with the inner peripheral surface of the coil 3, the magnetic element 4 can be driven to slide relatively to the coil 3 by the electromagnetic force generated by the coil 3 when supplied with current;

an iron core 5 connected with said valve core and said magnetic element 4, the top of the iron core 5 is connected with the bottom of the plunger piston 6a through a linker 10, and the bottom of the iron core 5 is directly fixed with the magnetic element 4;

and an elastic part, in this embodiment, the elastic part is a spring 8a which locates in the mounting hole 14 above the flow passage 13, one end of the spring 8a is against a top of the plunger piston 6a, the spring 8a acts on the valve core, the damping force of the spring 8a to the plunger piston 6a resists the electromagnetic force generated by the coil 3 to the magnetic element 4, in order to keep the plunger piston 6a in balance when moving.

Because of the electromagnetic influence, when the electromagnetic force generated by the coil 3 after supplied with current is larger than the elastic force of the spring 8a, the electromagnetic force will push the magnetic element 4 and the iron core 5 to slide upwards to further drive the plunger piston 6a slide upwards; when the plunger piston 6a moves upwards, the air inside the mounting hole 14 above the flow passage 13 exhausts out from the balance opening 141, in the same time, the upper edge of the ring groove 6a1 moves upwards relatively to the flow passage 13, and the lower portion of the plunger piston 6a starts to cover up the flow section of the flow passage 13, so as to reduce the flux of the fluid such as refrigerant from the inlet 11 passing through the flow passage 13; with the spring 8a being compressed, the damping force on the plunger piston 6a increases gradually, when the electromagnetic force on the plunger piston 6a is balanced with the damping force of the spring 8a, the plunger piston 6a remains in a certain position, so as to regulate the flux of the fluid such as refrigerant passing through the flow passage 13.

When the peripheral surface of the portion of the plunger piston 6a below the ring groove 6a1 fully covers up the flow passage 13, the refrigerant from the inlet 11 cannot pass through the flow passage 13 and drain outside from the outlet 12.

When the electromagnetic force on the magnetic element 4 is smaller than the elastic force of the spring 8a, the plunger piston 6a starts to slide downward under the elastic force of the spring 8a, the air inside the cavity 21 of the valve seat 2 exhausts out from the vent hole 22; in the meanwhile, the upper edge of the ring groove 6a1 moves downwards relatively to the flow passage 13, the lower portion of the plunger piston 6a gradually starts to leave away the flow section of the flow passage 13, so as to increase the flux of the fluid such as refrigerant from the inlet 11 passing through the flow passage 13 gradually; and the spring 8a gradually recovers, the damping forces on the plunger piston 6a reduces accordingly; when the electromagnetic force on the plunger piston 6a is balanced once again with the damping force of the spring 8a, the plunger piston 6a remains in a certain position, so as to reversely regulate the flux of the fluid passing through the flow passage 13.

When the peripheral surface of the portion of the plunger piston 6a below the ring groove 6a1 fully leaves away the flow passage 13, and the ring groove 6a1 is just fully inside the flow passage 13, the flow from the inlet 11 passes through the flow passage 13 in the maximum flux to outflow from the outlet 12.

Figure 6:
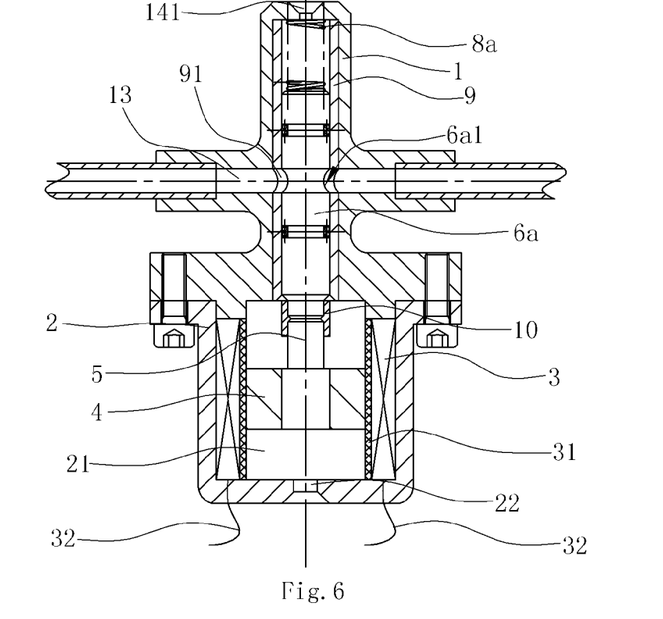
FIG. 6 is the sectional view of the second embodiment of the throttle valve of the present invention when the flow section of the flow passage is in the maximum state.
Figure 7:
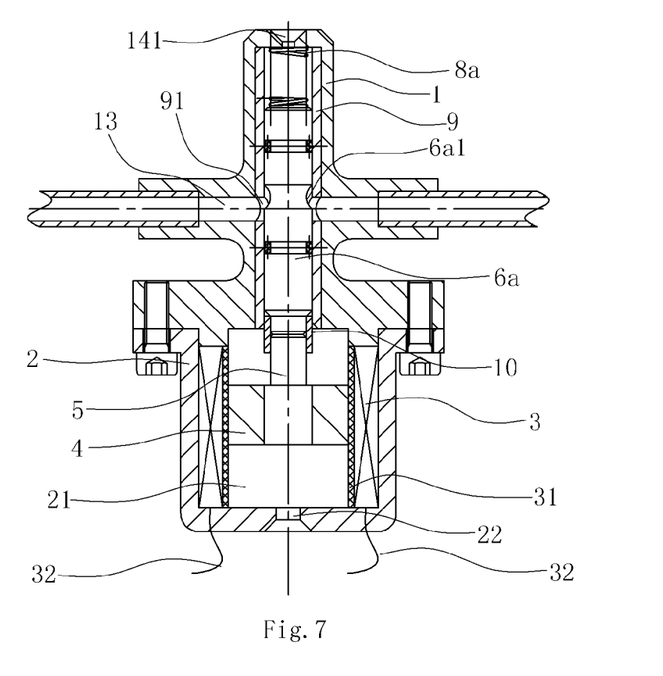
FIG. 7 is the sectional view of the second embodiment of the throttle valve of the present invention when the flow section of the flow passage is in the intermediate state.

FIG. 6 and FIG. 7 show the second embodiment of the present invention.

The difference of this embodiment compared with the first embodiment is that, a liner tube 9 is tightly inserted into the mounting hole 14, the liner tube 9 has a through hole 91 which is communicated with the flow passage 13, the through hole 91 is located in the flow passage 13 and the section of the flow passage 13 fully covers the section of the through hole 91, while the plunger piston 6a is located in the liner tube 9; seal rings 15 are respectively disposed between the peripheral wall of upper portion of the plunger piston 6a and the inner wall of the liner tube 9, and between the peripheral wall of lower portion of the plunger piston 6a and the inner wall of the liner tube 9.

The liner tube 9 can be made of good wear-resistant materials such as wear-resistant steels, therefore, the plunger piston 6a will not directly rub the inner wall of the mounting hole 14 and will directly rub the inner wall of the liner tube 9, while the liner tube 9 is wear-resistant, so the usage life of the throttle valve will be increase greatly.

Figure 8:
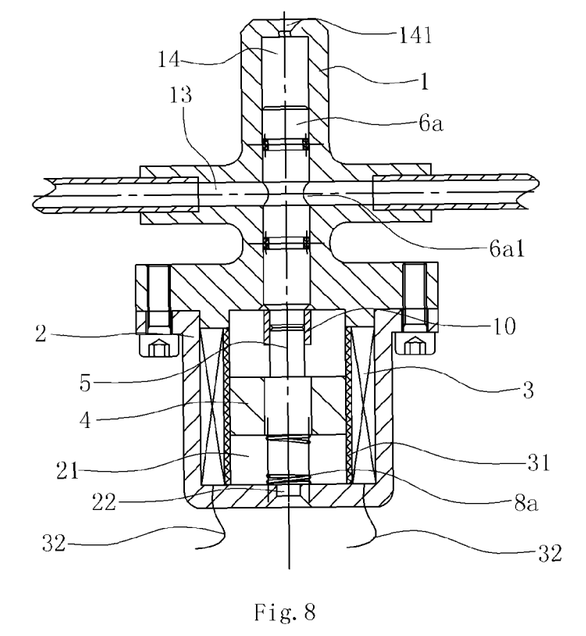
FIG. 8 is the sectional view of the third embodiment of the throttle valve of the present invention when the flow section of the flow passage is in the maximum state.
Figure 9:
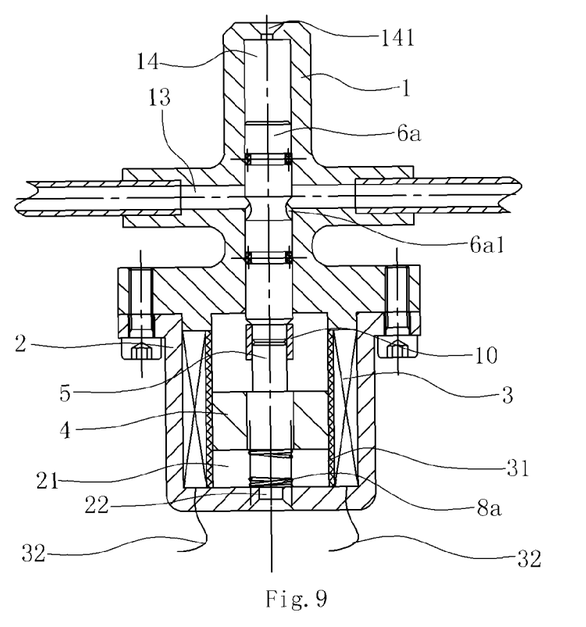
FIG. 9 is the sectional view of the third embodiment of the throttle valve of the present invention when the flow section of the flow passage is in the intermediate state.

FIG. 8 and FIG. 9 show the third embodiment of the present invention.

The difference of this embodiment compared with the first embodiment is that, although the elastic part is a spring 8a which locates in the cavity 21 of the actuator housing 2, and one end of the spring 8a resist against the bottom of the magnetic element 4.

In this embodiment, the current direction of the coil 3 is opposite to that of the first embodiment, that is, the electromagnetic force of the coil 3 on the magnetic element 4 is downward and opposite to that of the first embodiment.

Figure 10:
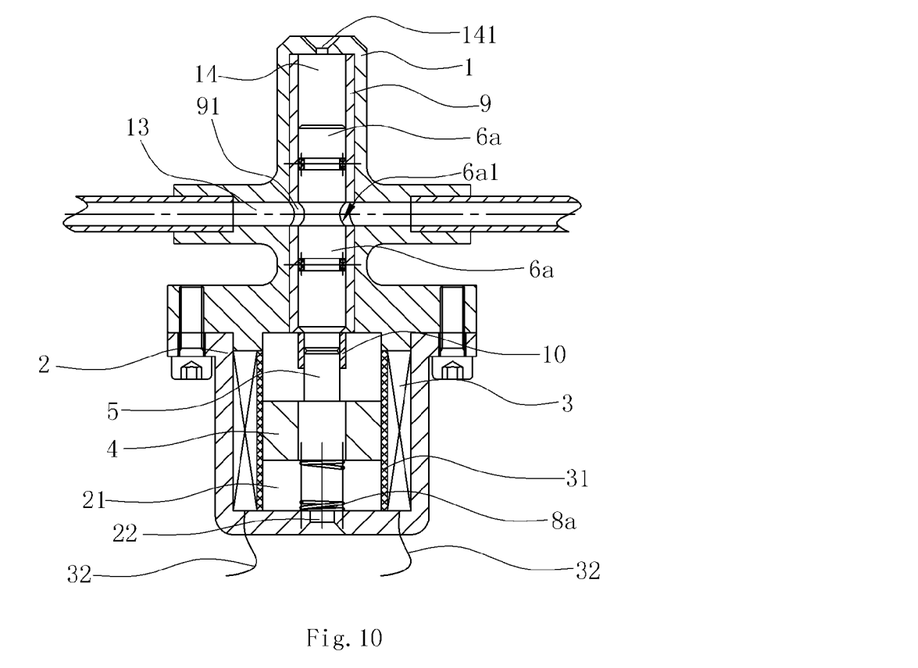
FIG. 10 is the sectional view of the forth embodiment of the throttle valve of the present invention when the flow section of the flow passage is in the maximum state.
Figure 11:
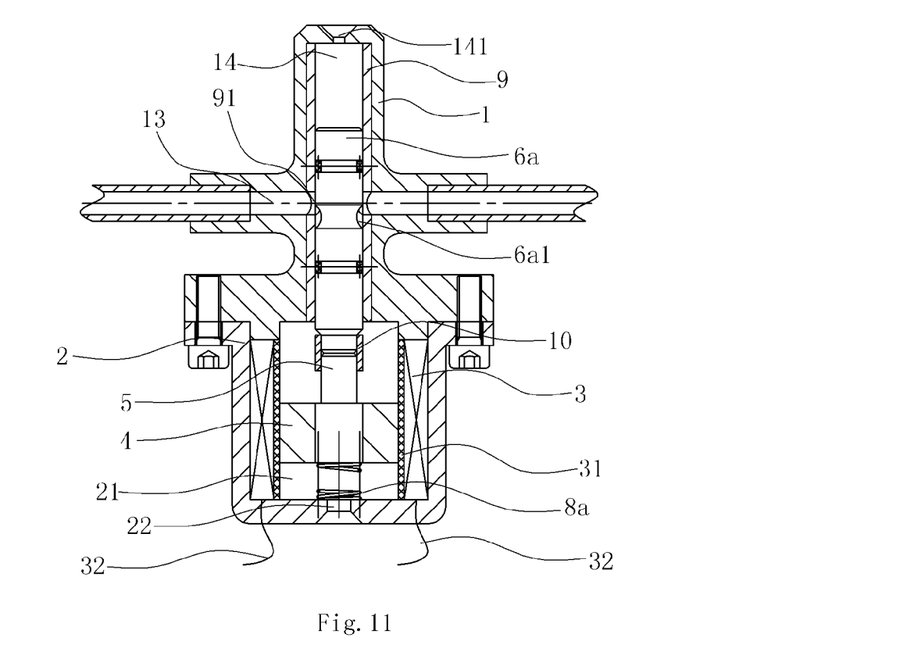
FIG. 11 is the sectional view of the forth embodiment of the throttle valve of the present invention when the flow section of the flow passage is in the intermediate state.

FIG. 10 and FIG. 11 show the forth embodiment of the present invention.

The difference of this embodiment compared with the third embodiment is that, a liner tube 9 is tightly inserted into the mounting hole 14, the liner tube 9 has a through hole 91 which is communicated with the flow passage 13, the through hole 91 is located in the flow passage 13 and the section of the flow passage 13 fully covers the section of the through hole 91, while the plunger piston 6a is located in the liner tube 9; seal rings 15 are respectively disposed between the peripheral wall of upper portion of the plunger piston 6a and the inner wall of the liner tube 9, and between the peripheral wall of lower portion of the plunger piston 6a and the inner wall of the liner tube 9.

Figure 12:
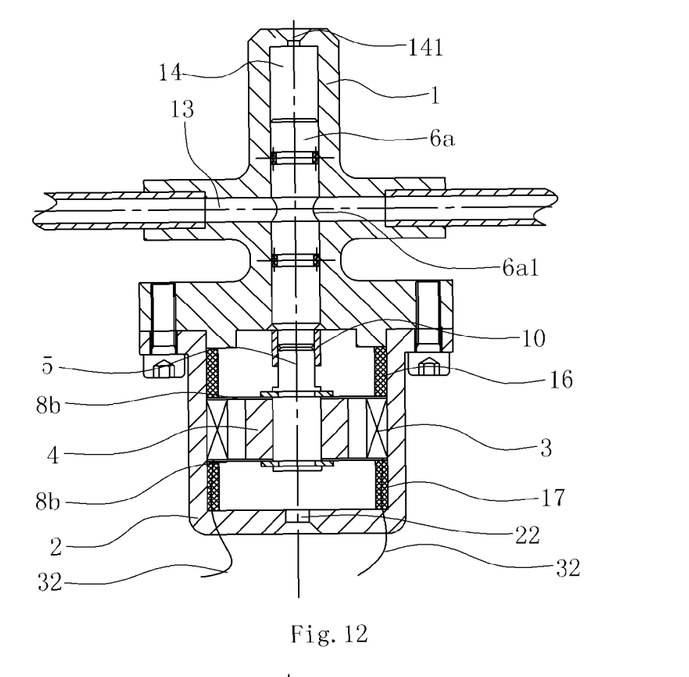
FIG. 12 is the sectional view of the fifth embodiment of the throttle valve of the present invention when the flow section of the flow passage is in the maximum state.
Figure 13:
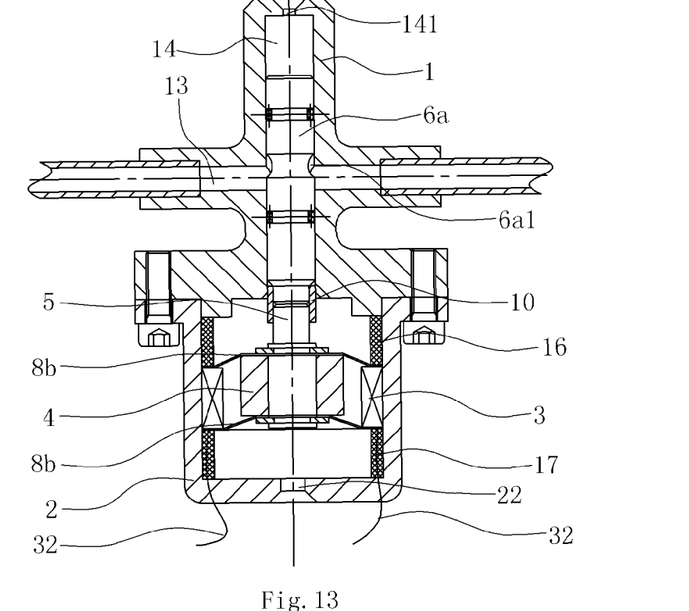
FIG. 13 is the sectional view of the fifth embodiment of the throttle valve of the present invention when the flow section of the flow passage is in the intermediate state.

FIG. 12 and FIG. 13 show the fifth embodiment of the present invention.

The difference of this embodiment compared with the third embodiment is that, an upper supporting sleeve 16 and a lower supporting sleeve 17 are disposed in the cavity 21 of the actuator housing 2, between these two supporting sleeves the coil 3 is located;

while said elastic part is two disk shaped springs 8b which include a first disk shaped springs 8b locating at the top of the coil 3 and a second disk shaped springs 8b locating at the bottom of the coil 3, an edge of the first disk shaped springs 8b is suppressed between the upper supporting sleeve 16 and the top of the coil 3, an edge of the second disk shaped springs 8b is suppressed between the lower supporting sleeve 17 and the bottom of the coil 3, and central parts of two disk shaped springs 8b are respectively fixed with the iron core 5.

When the magnetic element 4 drives the plunger piston 6a to slide, the disk shaped springs 8b will be compressed and have the damping force on the plunger piston 6a.

Figure 14:
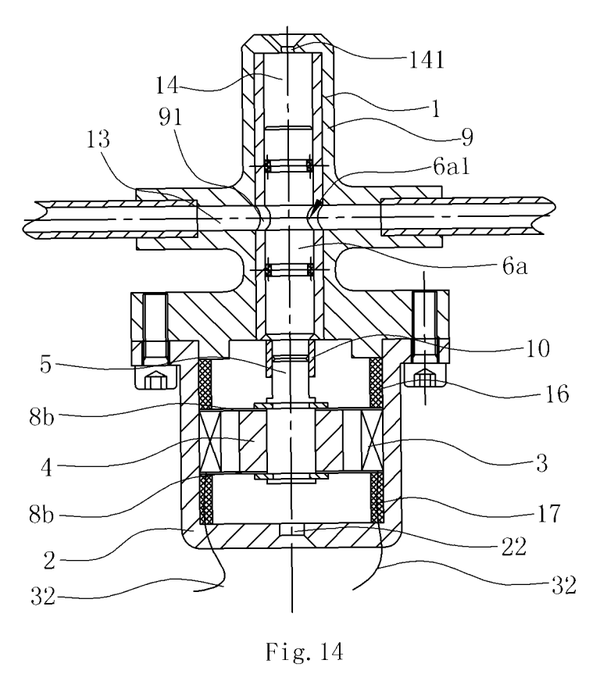
FIG. 14 is the sectional view of the sixth embodiment of the throttle valve of the present invention when the flow section of the flow passage is in the maximum state.
Figure 15:
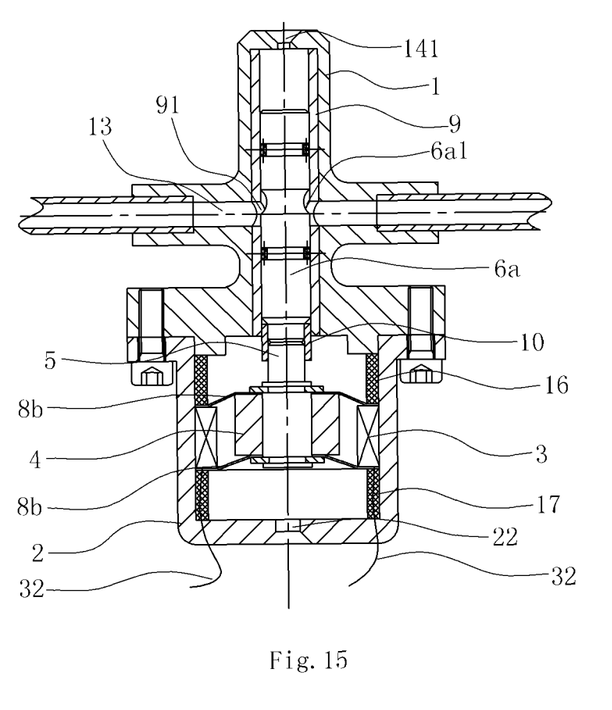
FIG. 15 is the sectional view of the sixth embodiment of the throttle valve of the present invention when the flow section of the flow passage is in the intermediate state.

FIG. 14 and FIG. 15 show the sixth embodiment of the present invention.

The difference of this embodiment compared with the fifth embodiment is that, a liner tube 9 is tightly inserted into the mounting hole 14, the liner tube 9 has a through hole 91 which is communicated with the flow passage 13, the through hole 91 is located in the flow passage 13 and the section of the flow passage 13 fully covers the section of the through hole 91, while the plunger piston 6a is located in the liner tube 9; seal rings 15 are respectively disposed between the peripheral wall of upper portion of the plunger piston 6a and the inner wall of the liner tube 9, and between the peripheral wall of lower portion of the plunger piston 6a and the inner wall of the liner tube 9.

Figure 16:
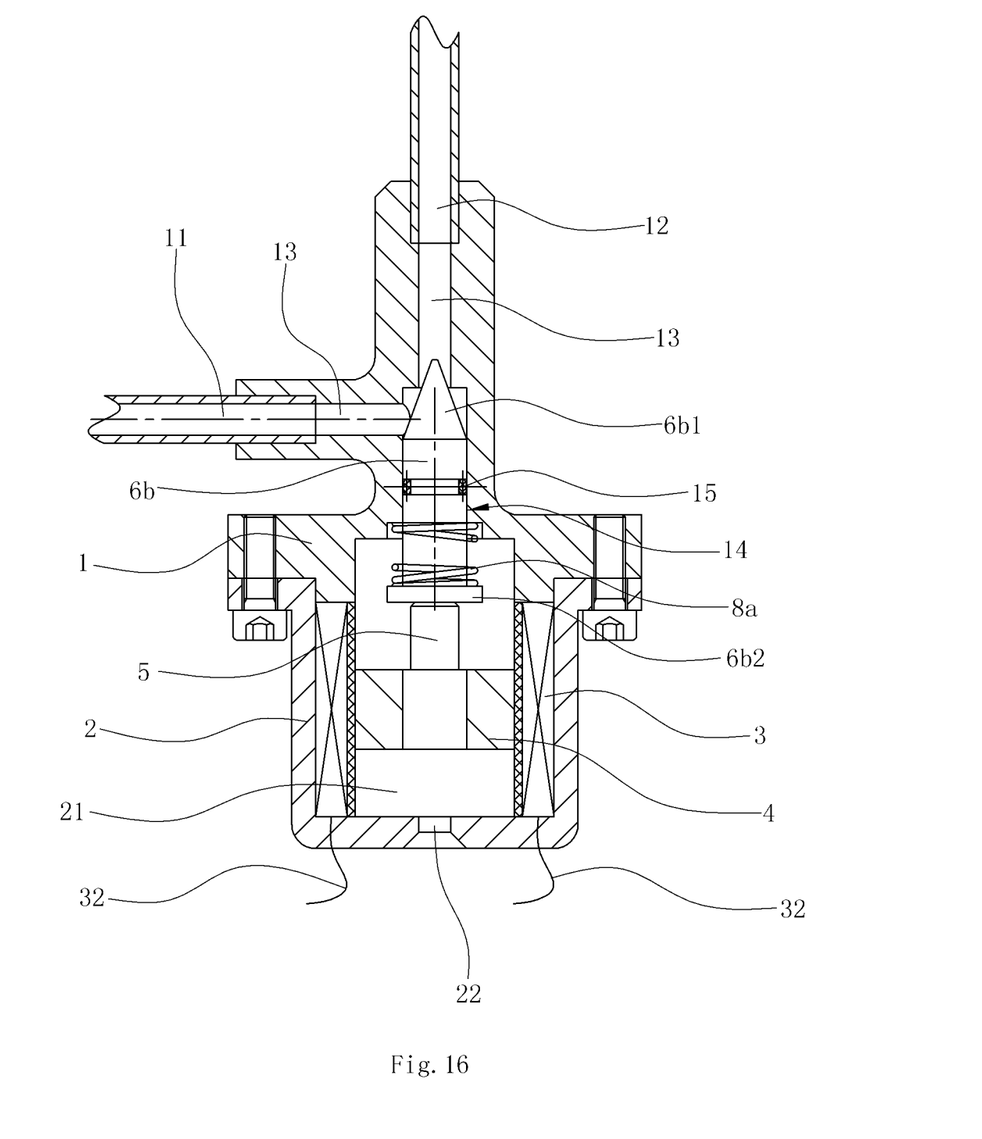
FIG. 16 is the sectional view of the seventh embodiment of the throttle valve of the present invention when the flow section of the flow passage is in the intermediate state.

FIG. 16 shows the seventh embodiment of the present invention.

The difference of this embodiment compared with the first embodiment is that, the flow passage 13 is L-shaped, said valve core is a valve needle 6b provided with a conical head 6b1 matching with a bottom of a vertical part of the flow passage 13, an outer end of the valve needle 6b enters into the cavity 21, and the bottom of the cavity 21 is provided with a vent hole 22.

The elastic part is a spring 8a disposed on the valve needle 6b, a top of the spring 8a resists against the bottom surface of the valve body 1 and the bottom of the spring 8a resists against a ring shoulder 6b2 formed on the bottom of the valve needle 6b.

Of course the spring 8a locates in the cavity 21 of the actuator housing 2, and one end of the spring 8a resist against the bottom of the magnetic element 4. In this embodiment, the current direction of the coil 3 is opposite to that of the first embodiment, that is, the electromagnetic force of the coil 3 on the magnetic element 4 is downward and opposite to that of the first embodiment.

Because of the electromagnetic influence, when the electromagnetic force generated by the coil 3 after supplied with current is larger than the elastic force of the spring 8a, the electromagnetic force will push the magnetic element 4 and the iron core 5 to slide upwards to further drive the valve needle 6b slide upwards; when the valve needle 6b moves upwards, the conical head 6b1 of the valve needle 6b will gradually enter into the lower opening of the vertical part of the flow passage 13, and the available flow space of the lower opening of the vertical part of the flow passage 13 will gradually become smaller and smaller; with the valve needle 6b moving upwards, the flow of fluid such as refrigerant reduces; with the spring 8a being compressed, the damping force on the valve needle 6b increases gradually; when the electromagnetic force on the valve needle 6b is balanced with the damping force of the spring 8a, the valve needle 6b remains in a certain position, so as to regulate the flux of the fluid such as refrigerant passing through the flow passage 13.

When the conical head 6b1 of the valve needle 6b fully inserts into the lower opening of the vertical part of the flow passage 13, the refrigerant from the inlet 11 cannot pass through the flow passage 13 and drain outside from the outlet 12. And the further the conical head 6b1 leaves away from the lower opening, the greater the flux of the fluid such as refrigerant passing through the flow passage 13 will be.

When the electromagnetic force on the magnetic element 4 is smaller than the elastic force of the spring 8a, the valve needle 6b starts to slide downward under the elastic force of the spring 8a, the air inside the cavity 21 of the valve seat 2 exhausts out from the vent hole 22; when the valve needle 6b slides downward, the conical head 6b1 of the valve needle 6b will gradually move away from the lower opening of the vertical part of the flow passage 13, and the available flow space of the lower opening of the vertical part of the flow passage 13 will gradually become larger and larger; with the valve needle 6b moving downwards, the flow of fluid such as refrigerant increases; with the spring 8a gradually recovering, the damping force on the valve needle 6a reduces gradually; when the electromagnetic force on the valve needle 6b is balanced once again with the damping force of the spring 8a, the valve needle 6b remains in a certain position, so as to reversely regulate the flux of the fluid such as refrigerant passing through the flow passage 13.

What is claimed is:

1. A throttle valve comprising:
    a valve body with an inlet and an outlet disposed on the wall of the valve body, provided with a flow passage in the valve body which is communicated with said inlet and said outlet, and a mounting hole in the valve body which is communicated with said flow passage;
    a valve core movably inserted inside the mounting hole, being able to slide relatively to said valve body to change a flow section of said flow passage for regulating a flux of flow passing through said flow passage, a sealing mechanism disposed between said valve core and said mounting hole to prevent the fluid entering into said mounting hole from said flow passage, an outer end of said valve core extending out of the valve body, an inner end of said valve core entering into said flow passage;
    a driving mechanism for the valve core disposed outside of the valve body and connected with the outer end of said valve core;
    characterized in that the driving mechanism directly drives the valve core to slide axially, said driving mechanism includes:
        an actuator housing fixed on said valve body, provided with a cavity inside, and the outer end of said valve core entering into said cavity;
        a coil disposed in said cavity;
        a magnetic element surrounded by said coil, which can be driven to slide relatively to said coil by an electromagnetic force generated by said coil when supplied with current;
        an iron core connected with said valve core and said magnetic element;
        an elastic part acting on said valve core, a damping force of the elastic part to said valve core resisting the electromagnetic force of said coil to said magnetic element; and
        a linker for rigidly connecting the iron core and the valve core, the linker having a form of a sleeve for fitting onto the iron core and the valve core.

2. The throttle valve according to claim 1, wherein
    the mounting hole runs through the flow passage; the valve core is a plunger piston with a ring groove for matching with the flow passage, the ring groove has a needle shape, an overlap area between the ring groove and the flow passage determines the flow section of the flow passage;
    an upper portion of the plunger piston is located in a portion of the mounting hole which is above the flow passage;
    a top wall of the mounting hole is provided with a balance opening;
    a lower portion of the plunger piston is located in a portion of the mounting hole which is below the flow passage; and
    the outer end of the plunger piston enters into the cavity, and a bottom wall of the cavity is provided with a vent hole.

3. The throttle valve according to claim 2, wherein the sealing mechanism comprises two seal rings which are disposed between the peripheral wall of the plunger piston and the inner wall of the mounting hole.

4. The throttle valve according to claim 2, wherein a liner tube is inserted into the mounting hole, the liner tube has a through hole which aligns with the flow passage, the plunger piston is located inside the liner tube.

5. The throttle valve according to claim 4, wherein the sealing mechanism comprises two seal rings which are disposed between the peripheral wall of upper portion of the plunger piston and the inner wall of the liner tube.

6. The throttle valve according to claim 2, wherein a top of the iron core is connected with a bottom of the plunger piston through the linker, and a bottom of the iron core is directly fixed with the magnetic element.

7. The throttle valve according to claim 2, wherein said elastic part is a spring which is located in the mounting hole above the flow passage, one end of the spring presses against the plunger piston.

8. The throttle valve according to claim 7, wherein a slide-guiding sleeve is inserted between the coil and the magnetic element.

9. The throttle valve according to claim 2, wherein said elastic part is a spring (8a) which is located in the cavity (21) of the actuator housing (2), and one end of the spring (8a) presses against the bottom of the magnetic element (4).

10. The throttle valve according to claim 9, wherein a slide-guiding sleeve (31) is inserted between the coil (3) and the magnetic element (4).

11. The throttle valve according to claim 2, wherein an upper supporting sleeve (16) and a lower supporting sleeve (17) are disposed in the cavity (21) of the actuator housing (2), between these two supporting sleeves the coil (3) is located;
    said elastic part is two disk shaped springs (8b), which include a first disk shaped spring (8b) located at a top of the coil (3) and a second disk shaped spring (8b) located at a bottom of the coil (3), an edge of the first disk shaped spring (8b) is suppressed between the upper supporting sleeve (16) and the top of the coil (3), an edge of the second disk shaped spring (8b) is suppressed between the lower supporting sleeve (17) and the bottom of the coil (3), and central parts of two disk shaped springs (8b) are respectively fixed with the iron core (5).

* * * * *